United States Patent
Maruyama et al.

(10) Patent No.: US 6,995,540 B2
(45) Date of Patent: Feb. 7, 2006

(54) ELECTRIC MOTOR CAR CONTROLLER (75) Inventors: Takafumi Maruyama, Tokyo (JP); Satoshi Azuma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/050,754

(22) Filed: Feb. 7, 2005

(65) Prior Publication Data
US 2005/0264255 A1   Dec. 1, 2005

(30) Foreign Application Priority Data
May 25, 2004   (JP)   ............................. 2004-154743

(51) Int. Cl.
*H02P 7/44*   (2006.01)
(52) U.S. Cl. ...................... 318/808; 318/801
(58) Field of Classification Search ................ 318/801, 318/808
See application file for complete search history.

(56) References Cited

U.S. PATENT DOCUMENTS

| | | | | |
|---|---|---|---|---|
| 4,327,313 A * | 4/1982 | Tsuboi et al. | ................. | 318/52 |
| 4,788,485 A * | 11/1988 | Kawagishi et al. | ......... | 318/811 |
| 5,184,057 A * | 2/1993 | Sakai et al. | .................. | 318/803 |
| 5,218,520 A * | 6/1993 | Rozman et al. | ............... | 363/39 |
| 5,231,339 A * | 7/1993 | Kishimoto et al. | ......... | 318/807 |
| 5,373,223 A * | 12/1994 | Akagi et al. | ................ | 318/722 |
| 5,532,569 A * | 7/1996 | Tanamachi et al. | ......... | 318/802 |
| 5,959,430 A * | 9/1999 | Yuki et al. | .................. | 318/805 |
| 6,166,514 A * | 12/2000 | Ando et al. | .................. | 318/811 |
| 6,242,895 B1 * | 6/2001 | Fujii et al. | ................... | 323/207 |
| 6,335,605 B1 * | 1/2002 | Negoro | ....................... | 318/727 |
| 6,479,971 B1 * | 11/2002 | Schrodl | ...................... | 322/32 |
| 6,556,460 B2 * | 4/2003 | Ishida et al. | ................. | 363/39 |
| 6,633,495 B2 * | 10/2003 | Ishda et al. | .................. | 363/95 |
| 6,642,689 B2 * | 11/2003 | Ishida et al. | ................ | 318/807 |
| 6,653,812 B1 * | 11/2003 | Huo et al. | ................... | 318/801 |
| 2003/0062870 A1 * | 4/2003 | Royak et al. | ............... | 318/727 |
| 2003/0169015 A1 * | 9/2003 | Royak et al. | ............... | 318/727 |
| 2004/0124807 A1 * | 7/2004 | Nakata et al. | ............. | 318/801 |
| 2004/0217728 A1 * | 11/2004 | Kawaji et al. | ............. | 318/801 |
| 2004/0232876 A1 * | 11/2004 | Matsushiro et al. | ........ | 318/801 |
| 2005/0002210 A1 * | 1/2005 | Moon et al. | .................. | 363/37 |
| 2005/0057212 A1 * | 3/2005 | Harbaugh et al. | .......... | 318/809 |
| 2005/0073280 A1 * | 4/2005 | Yoshinaga et al. | .......... | 318/727 |
| 2005/0110450 A1 * | 5/2005 | Stancu et al. | ............... | 318/609 |

* cited by examiner

*Primary Examiner*—David Martin
*Assistant Examiner*—Robert Horn
(74) *Attorney, Agent, or Firm*—Leydig, Voit & Mayer, Ltd.

(57) ABSTRACT

An electric motor car controller includes a voltage detector for detecting the voltage across a filter capacitor, an energy amount calculator for calculating the amount of energy of the filter capacitor from the output of the voltage detector, a frequency band component detector for extracting a given frequency band component included in the amount of energy, a frequency band component coefficient unit for multiplying the frequency band component by a coefficient and outputting a q-axis current command correcting value, and a q-axis current command correcting value adder for adding a q-axis current command correcting value to the q-axis current command value to correct the q-axis current command value.

8 Claims, 10 Drawing Sheets

ELECTRIC MOTOR CAR CONTROLLER

BACKGROUND OF THE INVENTION

1. Field of the Invention

This invention relates to an electric motor car controller for converting DC power collected from an overhead wire to AC power by a power converter and driving an AC motor.

2. Description of the Related Art

In the related art electric motor car controller, in order to remove impeding current contained in return current, first q-axis current iq1 is controlled by applying correcting amount dvq1 to q-axis voltage command vq1 based on voltage oscillation of a filter capacitor. A d-axis current id and the first q-axis current iq1 are found by rotational coordinate conversion based on the phase of the detected motor current.

It can be seen from a voltage equation (not described) on an AC motor in a d-q-axes-rotational coordinate system that d-axis and q-axis currents and magnetic fluxes are interrelated. That is, if only frequency ω1 is operated, the first q-axis current iq1 is controlled. In addition, d-axis current id, d-axis magnetic flux φd, and q-axis magnetic flux φq vary, producing interference. Accordingly, when the first q-axis current iq1 is controlled, variations in the d-axis current id and q-axis magnetic flux φq are suppressed by controlling the first q-axis current iq1 by the q-axis voltage vq, controlling the q-axis magnetic flux φq by the frequency ω1, and controlling the d-axis current id by the d-axis voltage vd (see, for example, JP-A-2002-238298 (page 5, page 7, and FIG. 6)).

In the related art electric motor car controller, a means for suppressing interference between d-axis and q-axis currents and magnetic fluxes is necessary. Therefore, there is the problem that the structure is made complex.

This invention has been made to solve the foregoing problem. The invention provides an electric motor car controller capable of reducing the harmonic components of return current by reducing the harmonic components contained in the amount of energy such that the amount of energy of a filter capacitor or filter reactor is treated as a subject of control.

SUMMARY OF THE INVENTION

An electric motor car controller associated with this invention is an electric motor car controller for smoothing DC power collected from an overhead wire by means of a filter reactor and a filter capacitor, converting the power into AC power with a power converter, driving a vehicle-driving AC motor, and calculating a voltage command to be applied to the power converter based on a commanded d-axis current command value and q-axis current command value by a voltage coordinate converter. The electric motor car controller comprises: a voltage detector for detecting the voltage across the filter capacitor; an energy amount calculator for calculating the amount of energy of the filter capacitor from output of the voltage detector; a band-frequency component detector for extracting a given band frequency component contained in the amount of energy; a band-frequency component coefficient unit for multiplying the band frequency component by a given coefficient and outputting a q-axis current command correcting value; and a q-axis current command correcting value adder for correcting the q-axis current command value by adding the q-axis current command correcting value to the q-axis current command value.

This invention reduces the frequency components in a given band contained in the amount of energy of the capacitor by correcting the q-axis current command value. Therefore, harmonic components which are the frequency components in the given band in the return current of the track circuit can be reduced. Consequently, obstacle to safety equipment attached to the track circuit can be prevented.

DESCRIPTION OF THE PREFERRED EMBODIMENTS

Embodiment 1

Figure 1:
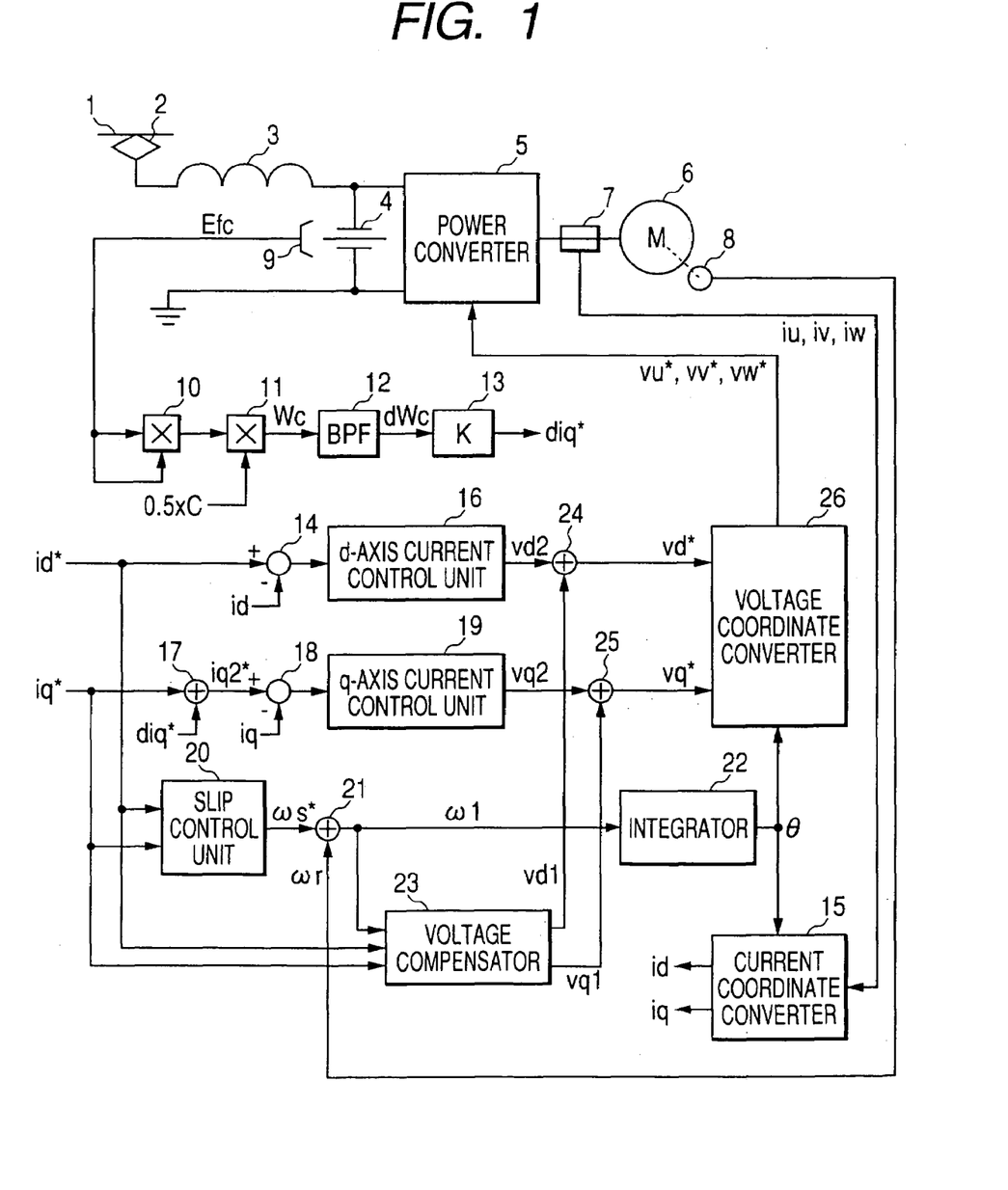
FIG. 1 is a structural diagram showing an electric motor car controller in mode of practice 1 for implementing this invention.

FIG. 1 is a structural diagram showing an electric motor car controller in mode of practice 1 for implementing this invention. In FIG. 1, a power converter 5 is connected with a current collector 2 via a filter reactor 3 and a filter capacitor 4, the collector collecting DC power from an overhead wire 1. An induction motor 6 for driving the electric motor car is connected with the side from which the AC power from the power converter 5 is outputted.

DC power is inputted from the overhead wire 1 via the current collector 2. The DC voltage is smoothed by the filter reactor 3 and filter capacitor 4. Then, the DC power is converted into arbitrary AC power by the power converter 5, driving the induction motor 6 for driving the vehicle.

Furthermore, a current detector 7 detects the current (three-phase current; iu, iv, and iw) through the induction motor 6 to control the induction motor 6 to arbitrary speed. In addition, a rotational speed detector 8 detects the rotational speed ωr of the induction motor 6.

The voltage Efc across the filter capacitor 4 is detected at a voltage detector 9. The voltage Efc is applied to a multiplier 10, where the square of the Efc is computed. The result of calculation of the multiplier 10 is multiplied by 0.5×C(C is the capacitance of the filter capacitor 4) by means of an energy amount calculator 11. The amount of energy Wc of the filter capacitor 4 is outputted from the energy amount calculator 11. Frequency components dWc in a given band are extracted from the amount of energy Wc by a band-frequency component detector 12 and multiplied by a factor of K by means of a band-frequency component coefficient unit 31. Thus, a q-axis current command correcting value diq* is calculated.

In a subtractor 14, d-axis current value id of the induction motor 6 obtained by the current detector 7 and current coordinate converter 15 is subtracted from the d-axis current command value id* corresponding to the magnetic flux axis of the induction motor 6. A d-axis current control unit 16 provides proportional control or proportional-plus-integral control, for example, of the result of the subtraction, outputting a d-axis voltage correcting signal value vd2.

Also, in a q-axis current command correcting value adder 17, q-axis current command value iq* corresponding to the torqued shaft of the induction motor 6 and the q-axis current command correcting value diq* are added up. A corrected q-axis current command value iq2* is outputted. In a subtractor 18, the q-axis current value iq of the induction motor 6 obtained by the current coordinate converter 15 is subtracted from the corrected q-axis current command value iq2*. A q-axis current control unit 19 provides proportional control or proportional-plus-integral control, for example, of the result of subtraction, outputting a q-axis voltage correcting signal value vq2.

A slip control unit 20 calculates a slip frequency command value ωs* from the d-axis current command value id* and from the q-axis current command value iq*. In an adder 21, the rotational speed ωr of the induction motor 6 delivered from the rotational speed detector 8 and the slip frequency command value ωs* are added up, outputting a power converter frequency command ω1. This corresponds to the frequency outputted from the power converter 5. The ω1 is inputted into an integrator 22, obtaining phase θ.

Additionally, the d-axis current command value id*, q-axis current command value iq*, and ω1 are inputted into a voltage compensator 23 and non-interference control terms vd1 and vq1 on the d- and q-axes are calculated. In an adder 24, the d-axis voltage value vd* produced by the power converter 5 is calculated. The q-axis voltage value vq* produced by the power converter is calculated by an adder 25. The d-axis voltage value vd* and q-axis voltage value vq* are inputted into a voltage coordinate converter 26. A voltage command signal (vu*, vv*, and vw*) to be produced finally by the power converter 5 is computed.

Figure 2:
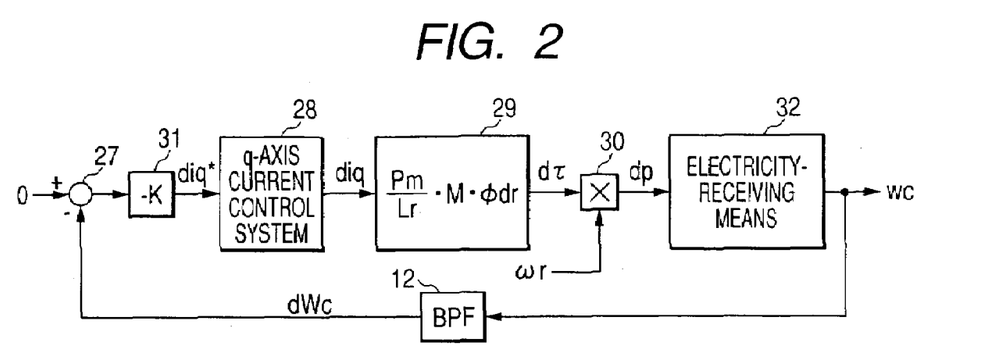
FIG. 2 is an explanatory diagram showing a control block for the amount of energy of a filter capacitor in FIG. 1.

Taking notice of the control system including the q-axis current command correcting value diq* results in a block diagram as shown in FIG. 2. Shown in FIG. 2 are a subtractor 27, a q-axis current control system 28, a transfer block 29 from q-axis current to torque in the inductor motor 6, a multiplier 30, a coefficient unit 31, and an electricity-receiving means 32 consisting of the filter reactor 3 and the filter capacitor 4. The coefficient unit 31 is the band-frequency component coefficient unit 31 to which "minus" is added. In FIG. 2, the expression has been so amended that a subtraction is performed by the subtractor 27 with the command value of dWc set to zero. Therefore, if dWc has a positive sign, for example, diq* assumes a positive sign, agreeing with the sign in FIG. 1.

The q-axis current control system 28 consists of the subtractor 18, q-axis current control unit 19, adder 25, voltage coordinate converter 26, and power converter 5. This forms a control system which makes the q-axis current value of the induction motor 6 equal to diq according to the q-axis current command correcting value diq*. With respect to the control system of the iq* that is an input signal, the q-axis current command correcting value adder 17 is omitted in FIG. 2. However, it is simultaneously controlled according to the q-axis current command value iq* such that the q-axis current through the induction motor 6 becomes iq. Therefore, the current value through the induction motor 6 is controlled to be iq2*(iq*+diq*). However, in FIG. 2, a block diagram taking note of the control system for the q-axis current correcting value diq* is shown.

In the transfer block 29, transfer characteristics from q-axis current to torque are shown. Torque produced by the induction motor 6 due to the q-axis current iq is shown. Since there is a relation, torque (dτ)×number of revolutions (ωr)=power (dp), the multiplier 30 shows power dp produced by the induction motor 6. The power produced by the induction motor 6 flows to the electricity-receiving means 32 through the power converter 5 and becomes energy Wc of the filter capacitor 4.

With DC overhead wiring, the voltage Efc across the filter capacitor 4 has a DC component and so if the Wc is calculated from the Efc, the amount of energy Wc includes energy of the DC component. Since the DC component is not a component to be suppressed, a given AC component of the amount of energy Wc of the filter capacitor 4 in the electricity-receiving means 32 is extracted as given band frequency component dWc by the band-frequency component detector 12. A feedback loop is so constructed that the band frequency component dWc becomes null. An error is calculated by the subtractor 27 in response to a command value of zero. The q-axis current command correcting value diq* is calculated via the coefficient unit 31. As mentioned above, the q-axis current control system is a control system including the q-axis current control unit 19. Here, the current follows the q-axis current command correcting value diq* with sufficiently high responsiveness. "diq" substantially coincident with diq* is obtained.

On the premise that control is provided on the d- and q-axes of the induction motor 6 by the current coordinate converter 15, the relation between the q-axis current iq and torque τ in the induction motor is generally given by Equation (1). Accordingly, the relation between diq and dτ can be expressed similarly to Equation (1). The transfer block 29 from diq to dτ is obtained. Pm is the number of pair poles. M is the mutual inductance. Lr is the secondary inductance. φdr is d-axis magnetic flux.

$$\tau = \frac{Pm}{Lr} \cdot M \cdot \phi dr \cdot iq \qquad (1)$$

Furthermore, since the product of the torque dτ and the rotational speed ωr of the induction motor 6 becomes power dp, the power dp can be expressed using the multiplier 30 in FIG. 2. Then, the power dp is entered into the electricity-receiving means 32, and the amount of energy Wc is accumulated in the filter capacitor 4.

Here, the subject of control becomes the AC component dWc of the given band frequency component included in the amount of energy Wc of the filter capacitor 4. Its command value is zero. Variations in the energy of the filter capacitor 4 are reduced by the feedback loop of FIG. 2. As a result, the AC component of the return current is suppressed.

Then, the transfer function from the power dp to the amount of energy Wc in the electricity-receiving means 32 is described. Since only the AC component is treated, if the DC component (DC voltage source of the overhead wire) in the electricity-receiving means 32 is neglected, the electricity-receiving means 32 is only made up of the filter reactor 3 and filter capacitor 4. Let P be the power from the induction motor 6 to the electricity-receiving means 32. The relation between the P and Wc is given by Equation (2). That is, the amount of energy of the filter capacitor 4 can be controlled by the power of the induction motor 6. In Equation (2), L is the inductance value of the filter reactor 3. C is the capacitance of the filter capacitor 4. R is the resistive component value of the filter reactor 3. s is the complex parameter in an s-function obtained by Laplace-transforming a time function.

$$Wc = \frac{sCL + RC}{s^2 CL + sRC + 1} \cdot P \qquad (2)$$

Figure 3A:
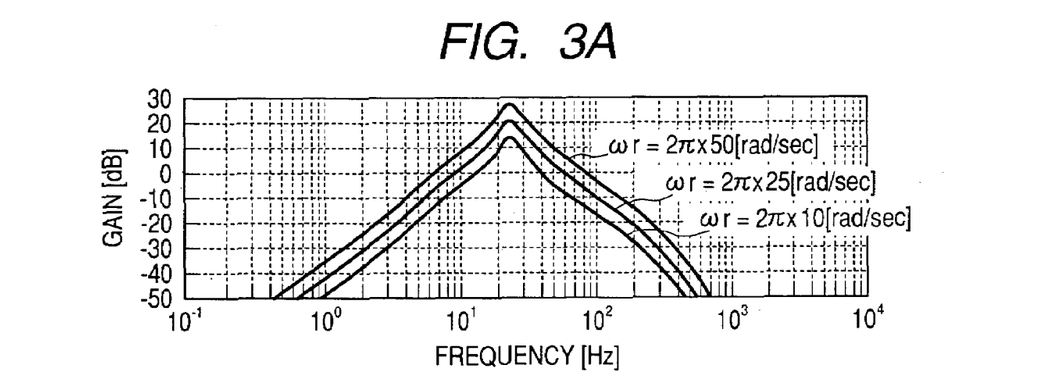
FIG. 3A is an explanatory diagram showing an open-loop Bode diagram regarding control of the amount of energy of the filter capacitor in FIG. 1.
Figure 3B:
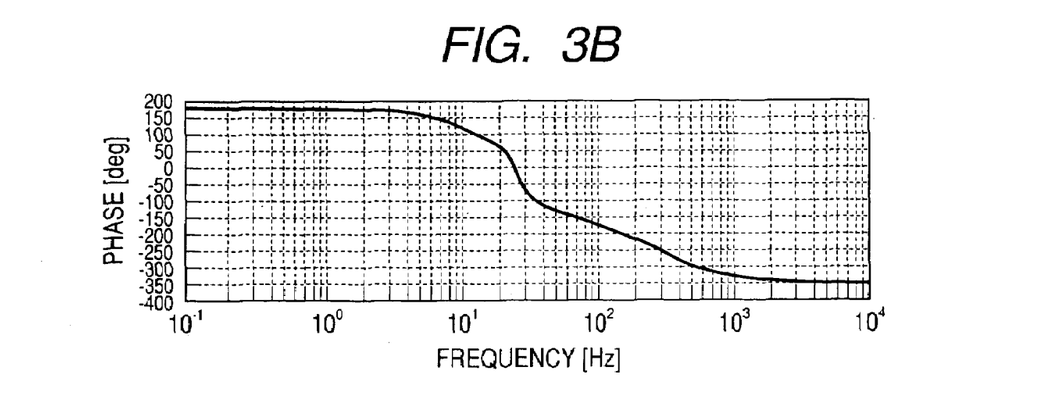
FIG. 3B is an explanatory diagram showing an open-loop Bode diagram regarding control of the amount of energy of the filter capacitor in FIG. 1.

An example of an open-loop Bode diagram owing to the block diagram of FIG. 2 is shown in FIGS. 3A and 3B. Here, the q-axis current control system 28 is set to a response to 300 (rad/sec). K=1 is set using the coefficient unit 31. The band-frequency component detector 12 is set to have a cutoff characteristic of 40 db/dec and a passband of 10 to 300 Hz. Furthermore, L=10 mH, C=4000 μF, R=0.4 Ω, Pm=2, Lr=35.5 mH, M=34.3 mH, and φdr=3.4 [Wb]. As a parameter, the rotational speed ωr of the induction motor 6 is selected to have three values: 2π×50 (rad/sec), 2π×25 (rad/sec), and 2π10 (rad/sec) as shown in FIG. 3A. As the rotational speed ωr increases, the open loop gain (Gain [dB]) increases. In this case, as shown in FIG. 3B, the phase (Phase [deg]) does not assume ±180° at gains of 0 dB or more in any case. Therefore, the control system becomes stable. Accordingly, the AC component of the given band frequency component included in the energy Wc of the filter capacitor 4 is reduced by an amount equal to the amount of gain in a band of gains of 0 dB or more in the open-loop Bode diagram.

The relation between the amount of energy Wc of the filter capacitor 4 and the current (return current Is) through the filter reactor 3 is next described. If the Efc is separated into DC component vdc and AC component vac, the amount of energy Wc is as given by Equation (3). The AC component Wcac of the amount of energy Wc is as given by Equation (4).

$$Wc = \frac{1}{2} C \cdot Efc^2 = \frac{1}{2} C(vdc + vac)^2 \qquad (3)$$
$$= \frac{1}{2} C(vdc^2 + 2vdc \cdot vac + vac^2)$$

-continued
$$Wcac = \frac{1}{2} C(2vdc \cdot vac + vac^2) = \frac{1}{2} C(2vdc + vac) \cdot vac \qquad (4)$$

For example, where the DC voltage of the electricity-receiving means 32 is 1500 V, it follows that vac<<2vdc (=3000 V). Therefore, Equation (5) holds. Consequently, suppressing the AC component of the amount of energy Wc is equivalent to suppressing the vac. As a result, this is equivalent to suppressing the return current Is.

$$Wcac = \frac{1}{2} C \cdot 2vdc \cdot vac = C \cdot vdc \cdot vac \qquad (5)$$

According to this configuration, the amount of energy Wc of the filter capacitor 4 is detected. Feedback control is provided such that the given band frequency component of the energy amount Wc becomes zero. The AC component of the energy amount Wc decreases. Therefore, the AC component of the frequencies in the given band of the return current in the track circuit can be attenuated. Obstacle to the track circuit can be circumvented.

Furthermore, it is only necessary to modify the q-axis current command value to realize the feedback control. A simple structure can be accomplished.

In addition, the feedback control can be linearized by taking the amount of energy Wc of the filter capacitor 4 as a subject of control. In consequence, the amount by which the AC component of the return current decreases can be accurately designed by means of a design using a simple open-loop Bode diagram.

Embodiment 2

Figure 4:
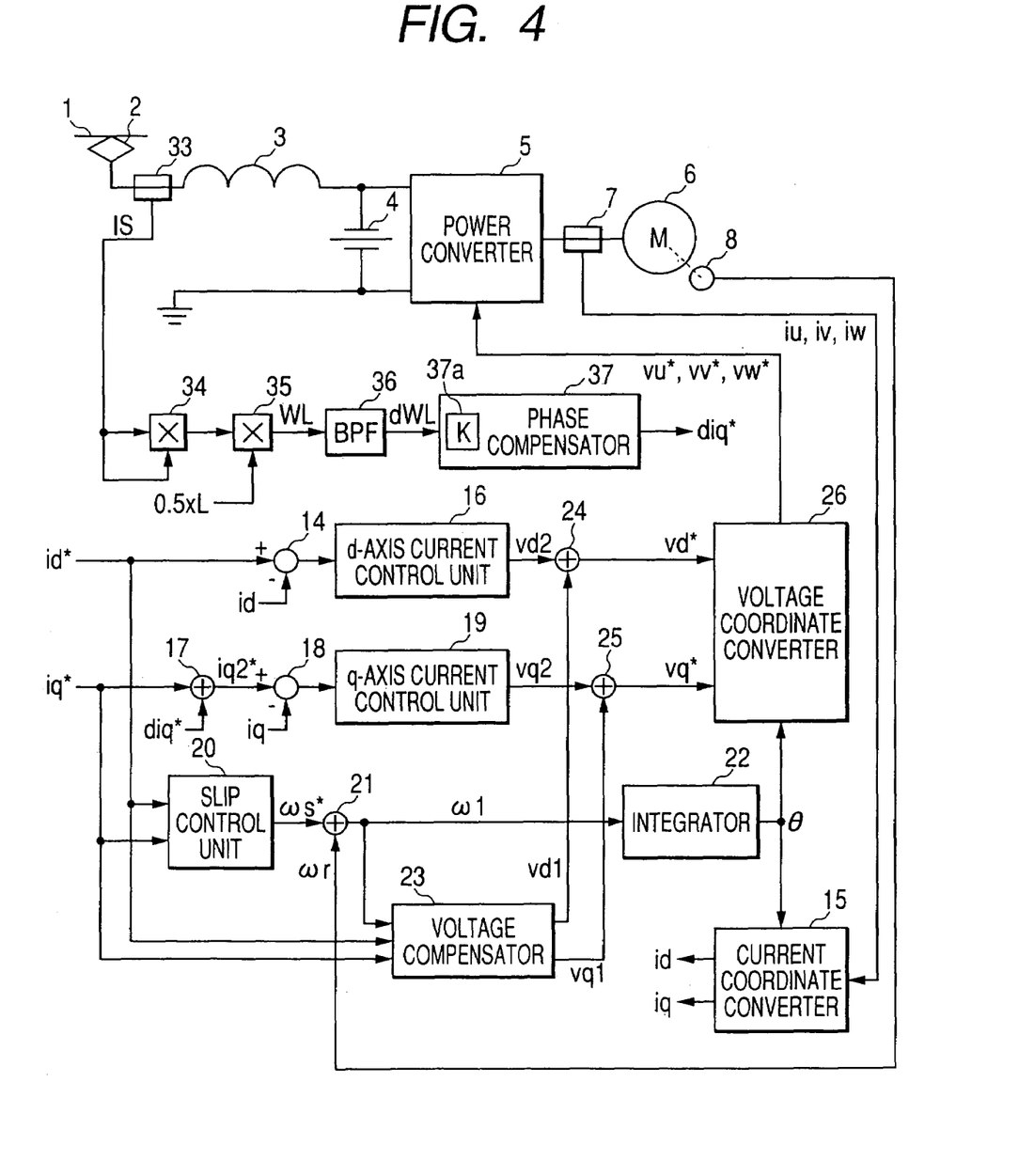
FIG. 4 is a structural diagram showing an electric motor car controller in mode of practice 2 for implementing this invention.

FIG. 4 is a structural diagram showing an electric motor car controller in mode of practice 2 for implementing this invention. In FIG. 4, those indicated by 1–8 and 14–26 are the same as in mode of practice 1.

Electric current Is through the filter reactor 3 is detected by a current detector 33. The current Is is inputted into a multiplier 34, where the square of the current Is is calculated. Furthermore, the result of the multiplier 34 is multiplied by 0.5×L (L is the inductance value of the filter reactor 3) by means of an energy amount calculator 35. As the output from the energy amount calculator 35, energy amount WL of the filter reactor 3 is calculated. The energy amount WL of the filter reactor 3 is outputted from the energy amount calculator 35. Given band frequency component dWL is extracted from the energy amount WL by means of a band-frequency component detector 36. Band frequency component dWL is multiplied by a factor of K by a coefficient unit 37a of a phase comparator 37, calculating q-axis current command correcting value diq*. Furthermore, the phase compensator 37 is assumed to have transfer characteristics G(s) as given by Equation (6), for example. Constants are so selected that the feedback control system becomes stable. In Equation (6), $T_1$ and $T_2$ are time constants.

$$G(s) = \frac{T_2 \cdot s + 1}{T_1 \cdot s + 1} \cdot K \qquad (6)$$

Figure 5:
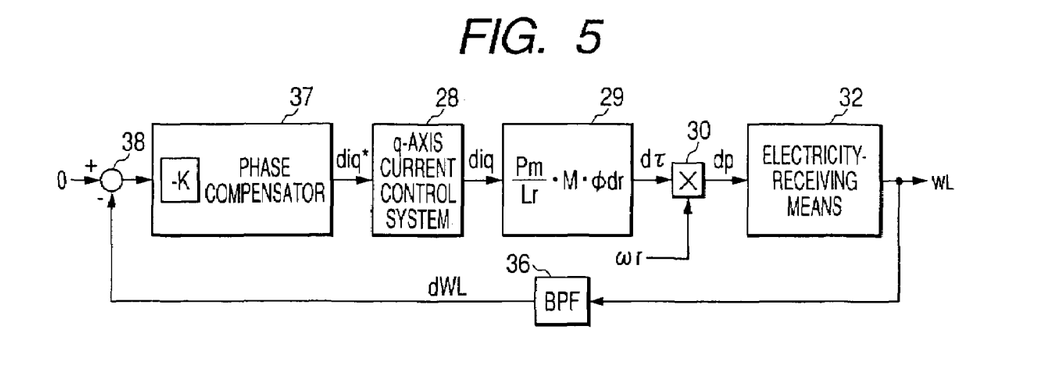
FIG. 5 is an explanatory diagram showing a control block for the amount of energy of a filter reactor in FIG. 4.

Taking notice of the control system including the q-axis current command correcting value diq* results in a block diagram as shown in FIG. 5. In FIG. 5, indicated by 38 is a subtractor. "minus" is added to the coefficient unit 37a. In FIG. 5, the expression has been so amended that a subtraction is performed by the subtracter 38 with the command value of dWL set to zero. Therefore, if dWL has a positive sign, for example, diq* assumes a positive sign, agreeing with the sign in FIG. 4.

Of the energy amount WL of the filter reactor 3 in the electricity-receiving means 32, the AC component of the given frequency band is extracted as given band frequency component dWL by means of the band-frequency component detector 36. The feedback loop is so constructed that the band frequency component dWL becomes null. The subtracter 38 calculates the error in response to a command value of zero, and diq* is calculated as q-axis current command correcting value via the phase compensator 37. The q-axis current control system is a control system including the q-axis current control unit 19. The current follows the q-axis current command correcting value diq* with sufficiently high responsiveness. "diq" substantially coincident with the q-axis current command correcting value diq* is obtained.

Then, the transfer function from the power dp to the amount of energy WL in the electricity-receiving means 32 is described. Since only the AC component is treated, if the DC component (DC voltage source of the overhead wire) in the electricity-receiving means 32 is neglected, the electricity-receiving means 32 is only made up of the filter reactor 3 and filter capacitor 4. Let P be the power from the induction motor 6 to the electricity-receiving means 32. The relation between the P and amount of energy WL is given by Equation (7). That is, the amount of energy of the filter reactor 3 can be controlled by the power of the induction motor 6. In Equation (7), L is the inductance value of the filter reactor 3. C is the capacitance of the filter capacitor 4. R is the resistive component value of the filter reactor.

$$WL = \frac{1}{s^3 CL + s^2 RC + s} \cdot P \quad (7)$$

Figure 6A:
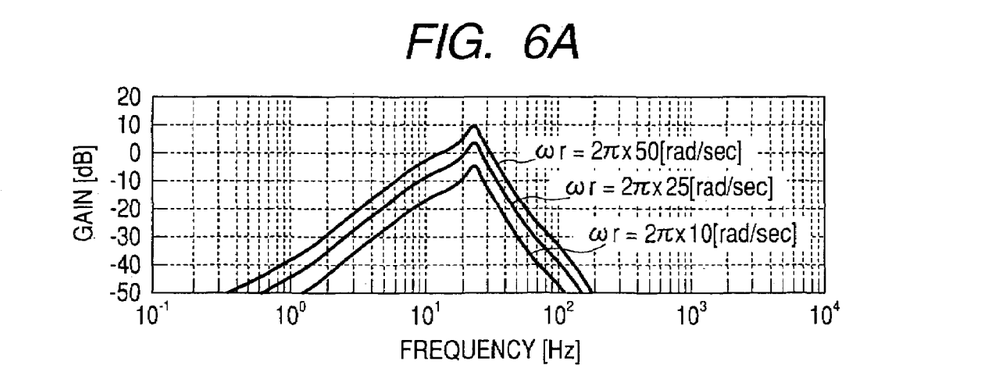
FIG. 6A is an explanatory diagram showing an open-loop Bode diagram regarding control of the amount of energy of the filter reactor in FIG. 4.
Figure 6B:
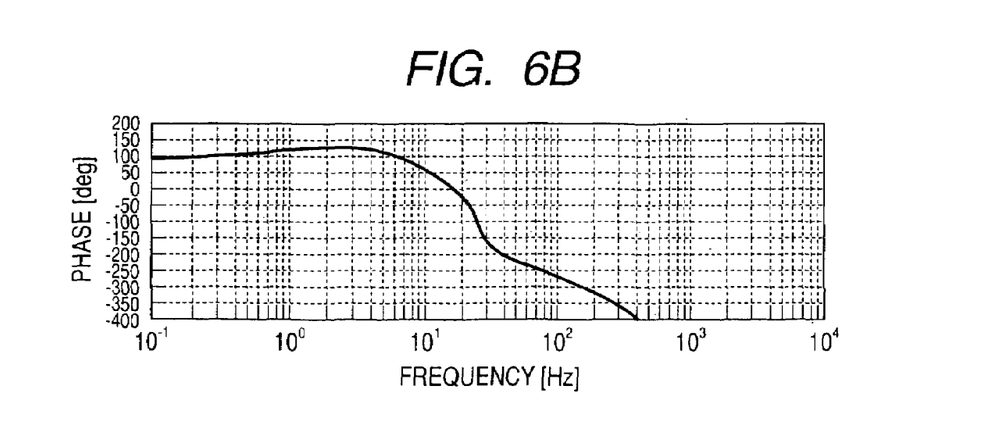
FIG. 6B is an explanatory diagram showing an open-loop Bode diagram regarding control of the amount of energy of the filter reactor in FIG. 4.

An example of an open-loop Bode diagram owing to the block diagram of FIG. 5 is shown in FIGS. 6A and 6B. Here, the q-axis current control system is set to a response of 300 (rad/sec). The gain K in the coefficient unit 37a is set to 0.005. The band-frequency component detector 36 is set to have a cutoff characteristic of 40 db/dec and a passband of 10 to 300 Hz. Furthermore, L=10 mH, C=4000° F., R=0.4 Ω, Pm=2, Lr=35.5 mH, M=34.3 mH, and φdr=3.4 [Wb] In addition, $T_1$ of Equation (6) is selected to be 0.016. $T_2$ is selected to be 0.0016. Moreover, as a parameter, the rotational speed ωr of the induction motor 6 is selected to have three values: 2π×50 (rad/sec), 2π×25 (rad/sec), and 2π×10 (rad/sec) as shown in FIG. 6A. As the rotational speed ωr increases, the open-loop gain increases. Additionally, as shown in FIG. 6B, the phase does not assume ±180° at gains of 0 dB or more in any case. Therefore, the control system becomes stable. Accordingly, the AC component of the energy amount WL of the filter reactor 3 is reduced by an amount equal to the amount of gain in a band of gains of 0 dB or more in the open-loop Bode diagram. In the example of FIGS. 6A and 6B, in the case where the rotational speed ωr is 2π×10 [rad/sec], the gain is 0 dB or less and so the effect of reducing the AC component of the energy WL is not obtained. However, as the rotational speed ωr is increased, the gain increases 0 dB or more. Thus, the effect of reducing it appears.

According to this configuration, the amount of energy WL of the filter reactor 3 is detected. Feedback control is provided such that the given band frequency component of the energy amount WL becomes zero. Consequently, the AC component of the energy amount WL decreases. Obstacle to the track circuit can be circumvented by attenuating the AC components of the frequencies in the given band of the return current.

Furthermore, feedback control can be accomplished simply by changing the q-axis current command value. A simple structure can be achieved.

In addition, the feedback control can be linearized by using the amount of energy WL of the filter reactor 3 as a subject of control. In consequence, the amount by which the AC component of the return current decreases can be accurately designed by means of a design using a simple open-loop Bode diagram.

Furthermore, the capacitances of the filter reactor 3 and filter capacitor 4 for suppressing the AC component of the return current can be reduced. Therefore, the whole construction can be reduced in size and weight.

Embodiment 3

Figure 7:
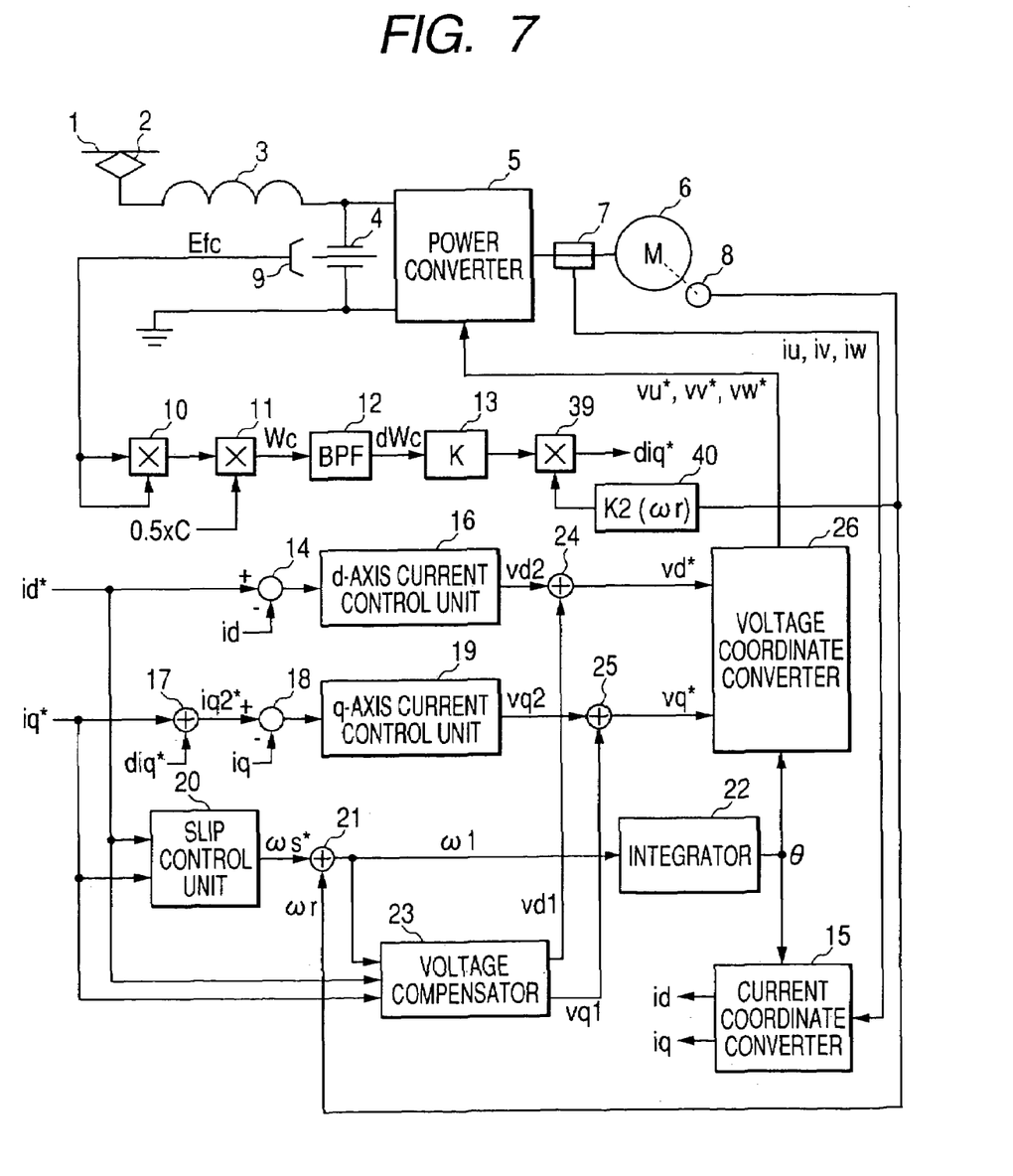
FIG. 7 is a structural diagram showing an electric motor car controller in mode of practice 3 for implementing this invention.

FIG. 7 is a structural diagram showing an electric motor car controller in mode of practice 3 for implementing this invention. In FIG. 7, those indicated by 1–26 are the same as in FIG. 1.

The q-axis current command correcting value diq* outputted from the band-frequency component coefficient unit 13 is entered into the rotational speed multiplier 39. Also, the rotational speed ωr outputted by the rotational speed detector 8 is set to a rotational speed coefficient K2 by a rotational speed coefficient unit 40.

As shown in the block diagrams of FIGS. 2 and 5 and in the open-loop Bode diagrams of FIGS. 3 and 6, the gain varies in proportion to the rotational speed ωr of the induction motor 6. For example, a difference of 6 dB is produced between the case in which the rotational speed ωr is 2π×25 (rad/sec) and the case in which it is 2π×50 (rad/sec). As the rotational speed ωr decreases, decreases in the AC components of the amounts of energy in the filter capacitor 4 and filter reactor 3 are spoiled.

Figure 8:
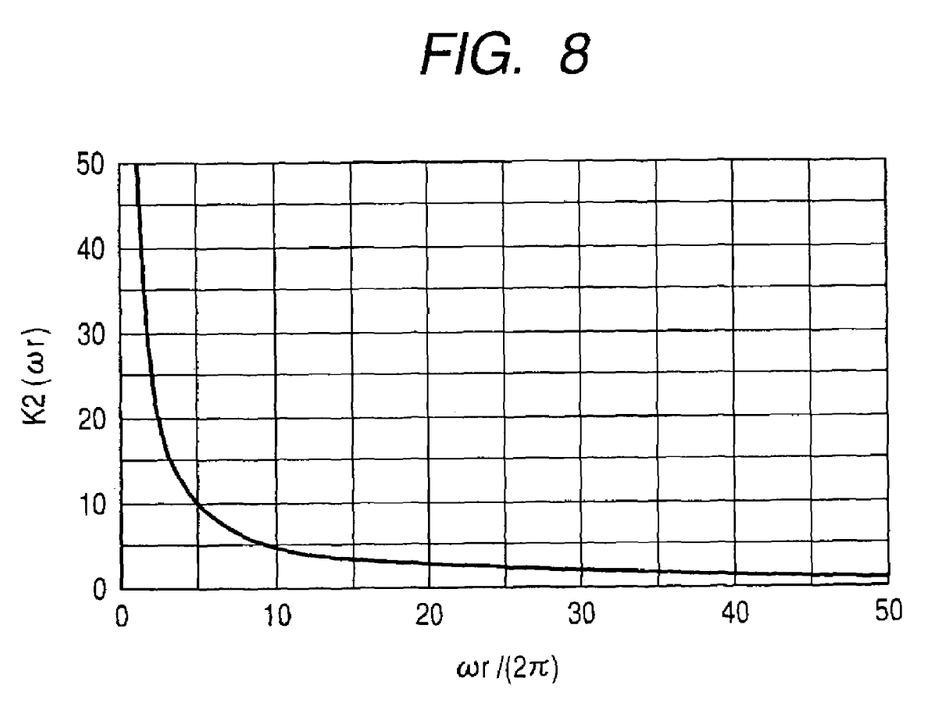
FIG. 8 is an explanatory diagram showing the gain in FIG. 7.

Accordingly, if the rotational speed ωr is low, the gain in the open-loop Bode diagram is prevented from decreasing by the rotational speed coefficient K2. Because of the block diagrams of FIGS. 2 and 5, the gain in the open-loop Bode diagram is in proportion to the rotational speed ωr. Therefore, the rotational speed coefficient K2 (ωr) is set to a gain that is inversely proportional to the rotational speed ωr as shown in FIG. 8. In this example, the gain of the open-loop Bode diagram is set to a higher value at any frequency, for example. Here, the relation between the rotational speed coefficient K2 and the rotational speed ωr is set as given by Equation (8) to introduce the condition assumed when ωr=2π×50 (rad/sec)

$$K2=50/(\omega r/2\pi) \quad (8)$$

According to this configuration, a constant open-loop gain can be gained at all times irrespective of the rotational speed ωr of the induction motor 6 by means of design. Therefore, even at low rotational speed ωr, the AC component in the filter capacitor 4 can be reduced.

In the above description of mode of practice 3, the energy of the filter capacitor 4 is a subject of control. Similar effects can be expected where the energy of the filter reactor 3 as shown in FIG. 4 of mode of practice 2 is treated as a subject of control.

Furthermore, in the above description of mode of practice 3, the input to the rotational speed coefficient unit 40 is the rotational speed ωr of the induction motor 6. In a case where the value of the output ωs* from the slip control unit 20 is sufficiently small compared with the rotational speed ωr, similar effects can be expected even if the power converter frequency instruction ω1 is taken as the input to the rotational speed coefficient unit 40.

Embodiment 4

Figure 9:
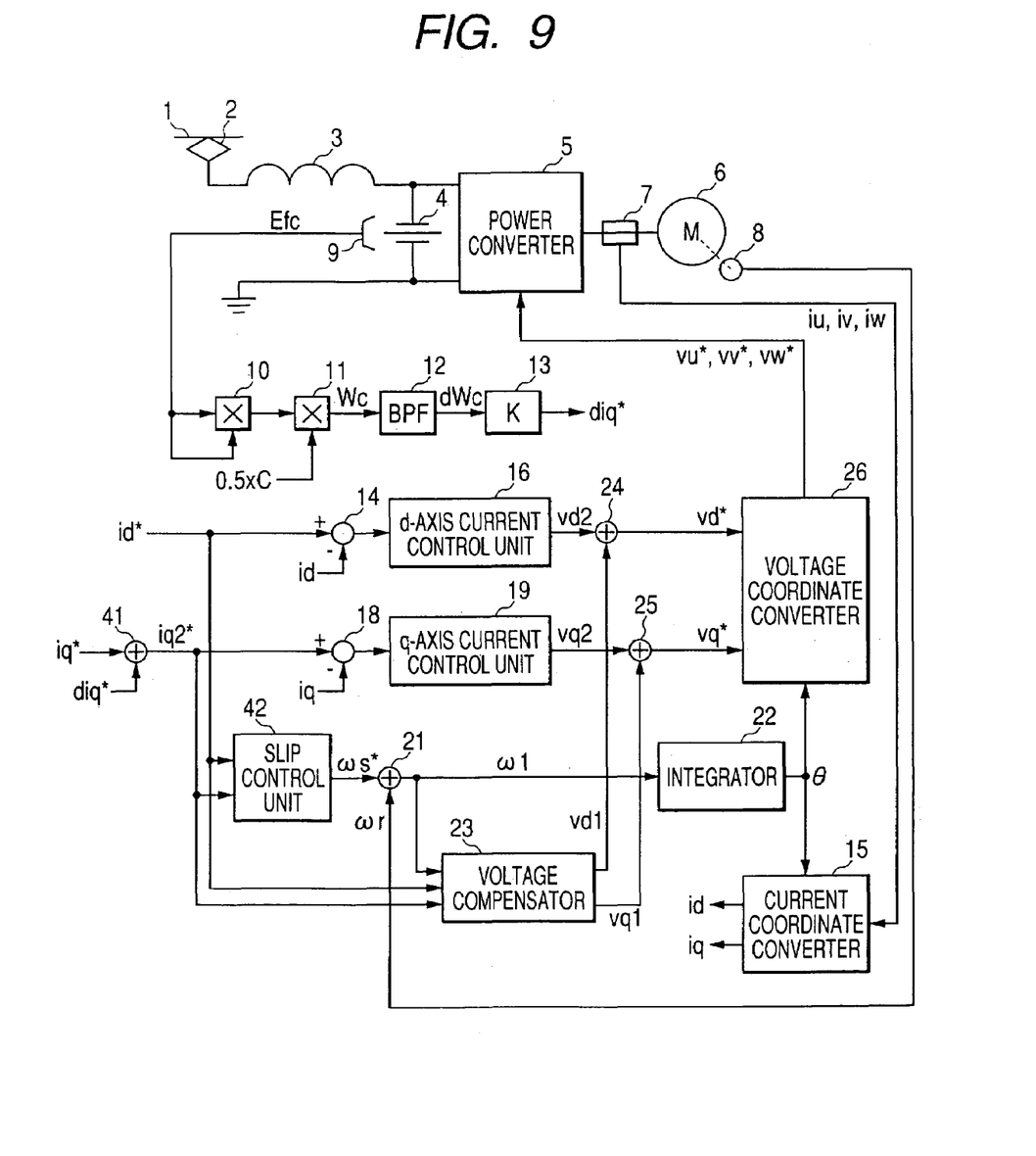
FIG. 9 is a structural diagram showing an electric motor car controller in mode of practice 4 for implementing this invention.

FIG. 9 is a structural diagram showing an electric motor car controller in mode of practice 4 for implementing this invention. In FIG. 9, those indicated by 1–16, 18, 19, 21, and 22–26 are the same as in mode of practice 1. In FIG. 9, q-axis current command value iq* and q-axis current command correcting value diq* are summed up by an adder 41, outputting the corrected q-axis current command value iq2*. By inputting this corrected q-axis current command value iq2* into a slip control unit 42, the slip frequency ωs* is modified together with the q-axis current command value iq*. In this way, in order to control the induction motor 6 in principle on the d- and q-axes, the slip frequency ωs* may be modified according to the q-axis current command value iq2*.

According to this configuration, the q-axis current is controlled on the d- and q-axes coincident with the induction motor 6. Therefore, the AC component in the amount of energy of the filter capacitor 4 can be reduced more accurately.

In mode of practice 4, the energy of the filter capacitor 4 is a subject of control. Similar effects can be expected even if the amount of energy of the filter reactor 3 is taken as a subject of control.

Embodiment 5

Figure 10:
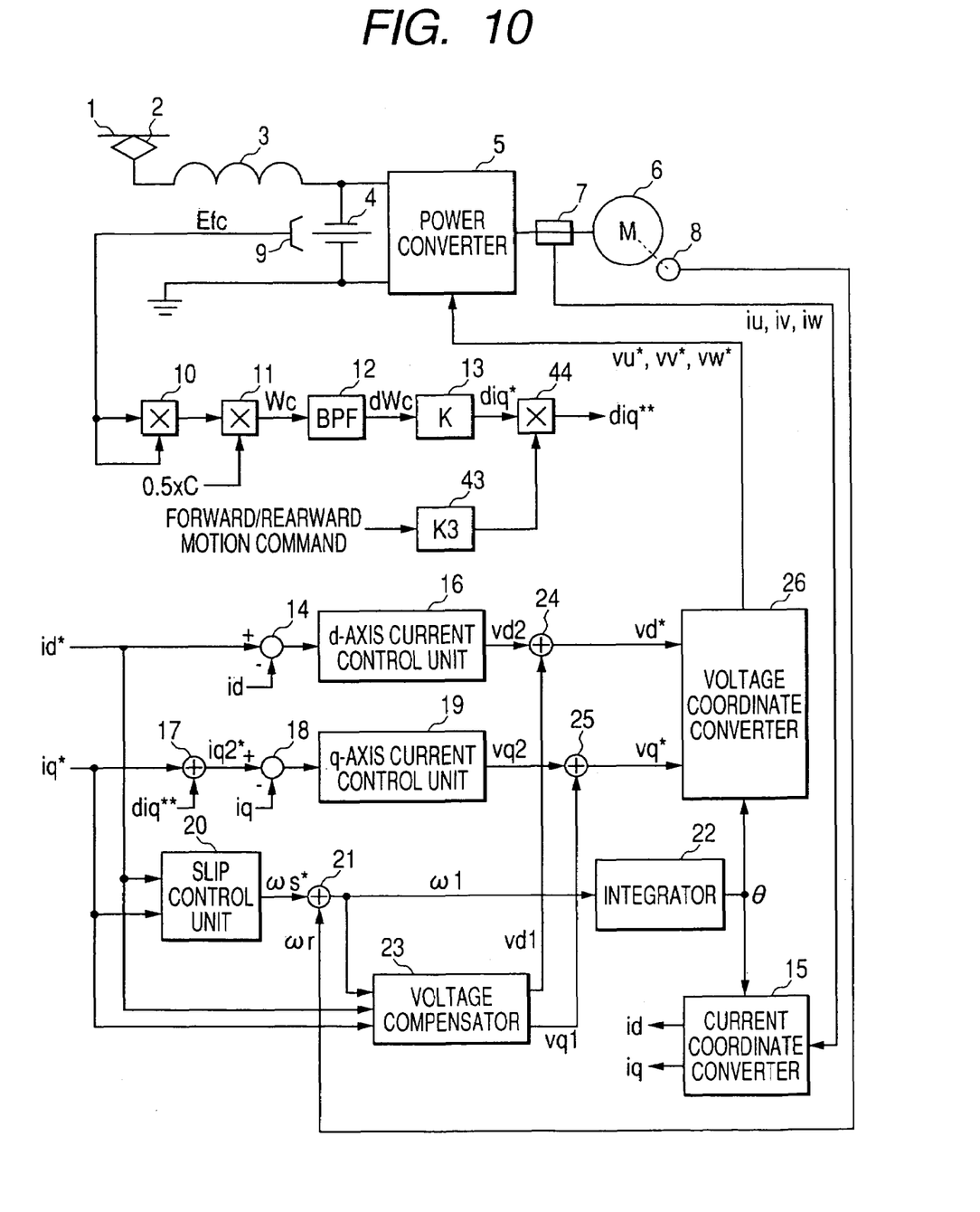
FIG. 10 is a structural diagram showing an electric motor car controller in mode of practice 5 for implementing this invention.

FIG. 10 is a structural diagram showing an electric motor car controller in mode of practice 5 for implementing this invention. In FIG. 10, those indicated by 1–26 are the same as in mode of practice 1. A direction command coefficient unit 43 outputs "1" when a command for the direction of motion about forward or rearward motion of the electric motor car is received, and if the command is a command for forward motion. If the command is a command for rearward motion, the unit outputs "−1". When the q-axis current command correcting value diq* outputted from the band-frequency component coefficient unit 13 and a motion direction command outputted from the direction command coefficient unit 43 are entered into a direction command multiplier 44, a q-axis current command correcting value diq** with a sign corresponding to the motion direction command is outputted from the direction command multiplier 44.

Figure 11A:
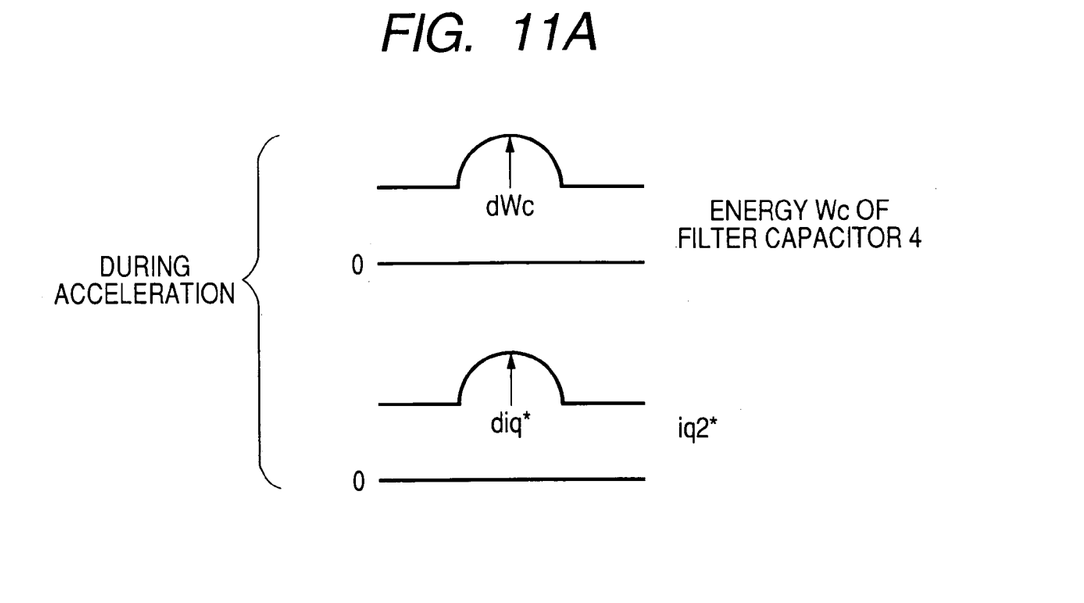
FIG. 11 is an explanatory diagram showing the amount of energy of the filter capacitor in FIG. 10 during forward rotation.
Figure 11B:
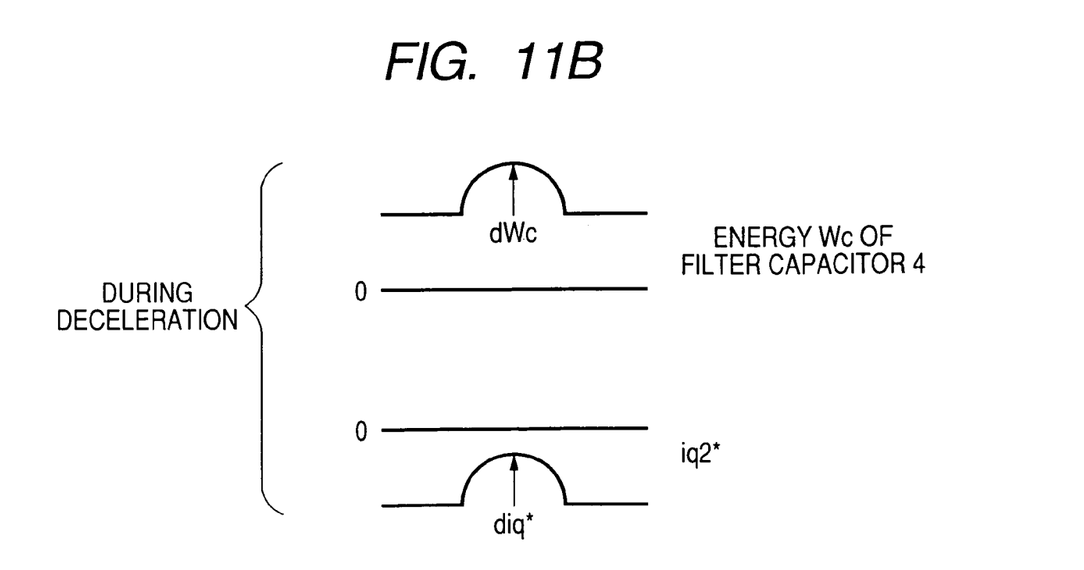

FIG. 11 is an explanatory diagram schematically showing the relation between the energy amount Wc of the filter capacitor 4 and iq2* during forward motion (during forward rotation of the induction motor 6). In FIG. 11, (a) shows the relation during acceleration, and (b) shows the relation during deceleration. In (a), when the amount of energy Wc of the filter capacitor 4 increases by given band frequency component dWc, the q-axis current command correcting value diq is obtained such that the induction motor 6 deprives the energy of the filter capacitor 4. In (b), the q-axis current command correcting value diq is obtained such that no energy is returned to the filter capacitor 4.

Figure 12A:
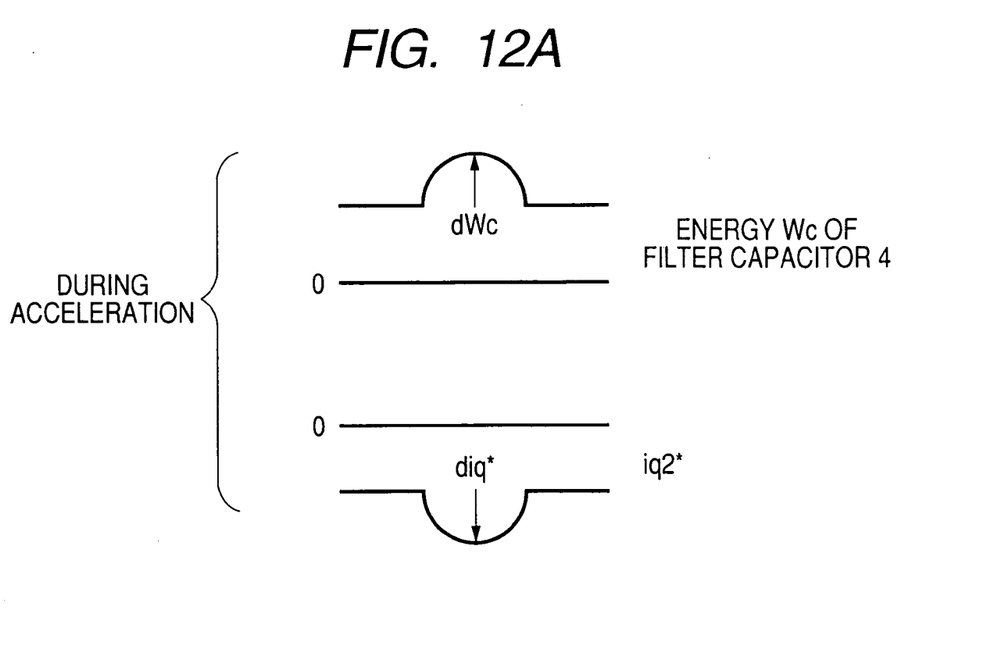
FIG. 12 is an explanatory diagram showing the amount of energy of the filter capacitor in FIG. 10 during reverse rotation.
Figure 12B:
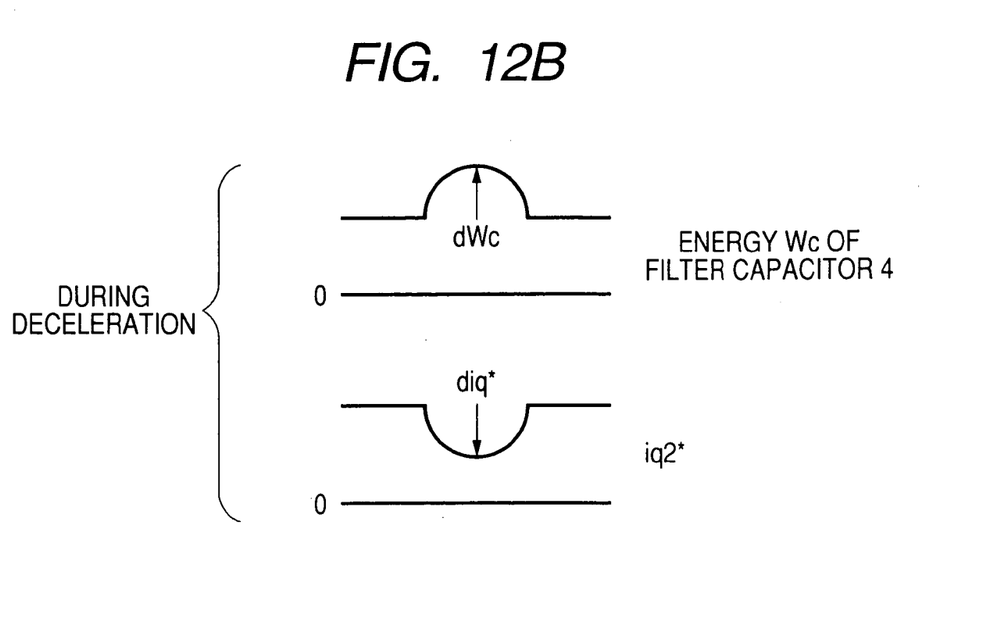

FIG. 12 is an explanatory diagram schematically showing the relation between the amount of energy Wc of the filter capacitor 4 and iq2* during rearward motion (during rearward rotation of the induction motor 6). In FIG. 12, (a) shows the relation during acceleration, and (b) shows the relation during deceleration. In (a), the q-axis current command correcting value diq is obtained such that the energy of the filter capacitor 4 is deprived. In (b), the q-axis current command value correcting value diq is obtained such that no energy is returned to the filter capacitor 4.

The q-axis current command iq* should reverse in sign between forward and rearward motions. Therefore, as shown in FIGS. 11 and 12, the sign of the q-axis current command correction diq* reverses. That is, the sign may be varied like the q-axis current command correction diq** depending on commands for forward and rearward motions.

According to this configuration, the AC component of the energy in the filter capacitor 4 can be effectively reduced irrespective of whether the motor rotates forwardly or rearwardly by varying the sign like the q-axis command correcting signal diq** depending on forward and rearward motions.

In mode of practice 5, the energy of the filter capacitor 4 is taken as a subject of control. Similar effects can be expected even if the energy of the filter reactor 3 is taken as a subject of control.

Furthermore, in the above description of mode of practice 1 through mode of practice 5, the rotational speed ωr of the induction motor 6 is detected by the rotational speed detector 8. Similar effects can be expected if the rotational speed estimation value ωr is estimated from the q-axis current command value iq* or the like.

Additionally, in the above description of mode of practice through mode of practice 5, the induction motor 6 is driven the output of the power converter 5. Similar effects can be expected even about an AC motor such as a synchronous motor.

What is claimed is:

1. An electric motor car controller for smoothing DC power collected from an overhead wire via a filter reactor and a filter capacitor, converting the DC power into AC power with a power converter, driving a vehicle-driving AC motor, and calculating a voltage command to be applied the power converter based on a d-axis current command value and a q-axis current command value commanded by a voltage coordinate converter, the electric motor car controller comprising:

a voltage detector for detecting a voltage across the filter capacitor;

an energy amount calculator for calculating an amount of energy of the filter capacitor from the voltage detected by the voltage detector;

a frequency band component detector for extracting a given frequency band component contained in the amount of energy;

a frequency band component coefficient unit for multiplying the frequency band component by a given coefficient and outputting a q-axis current command correcting value; and a q-axis current command correcting value adder for correcting the q-axis current command value by adding the q-axis current command correcting value to the q-axis current command value.

2. The electric motor car controller as in claim 1, further comprising:
   a rotational speed detector for detecting rotational speed of the AC motor;
   a rotational speed coefficient unit for outputting a rotational speed coefficient inversely proportional to the rotational speed; and
   a rotational speed multiplier for correcting the q-axis current command correcting value according to the rotational speed by multiplying the q-axis current command correcting value by the rotational speed coefficient.

3. The electric motor car controller as in claim 1, further comprising:
   a direction command coefficient unit for receiving a motion direction command for forward motion or rearward motion of an electric motor car and outputting a direction coefficient responsive to the motion direction in response to a motion direction command; and
   a direction command multiplier for multiplying the q-axis current command correcting value and said by the direction command coefficient and correcting the q-axis command current correcting value according to the motion direction.

4. The electric motor car controller as in claim 1, further comprising a slip control unit for calculating a slip frequency command for the AC motor using an output from said q-axis current command correcting value adder which adds the q-axis current command value to the q-axis current command correcting value and which corrects the q-axis current command value.

5. An electric motor car controller for smoothing DC power collected from an overhead wire means of via a filter reactor and a filter capacitor, converting the power into AC power with a power converter, driving a vehicle-driving AC motor, and calculating a voltage command to be applied to the power converter based on a d-axis current command value and a q-axis current command value commanded by a voltage coordinate converter, the electric motor car controller comprising:
   a current detector for detecting an electrical current passing through the filter reactor;
   an energy amount calculator for calculating an amount of energy of the filter reactor from the current detected by the current detector;
   a frequency band component detector for extracting a given frequency band component included in the amount of energy;
   a phase compensator for multiplying the frequency band component by a given coefficient, providing phase compensation of the component, and outputting a q-axis current command correcting value; and
   a q-axis current command correcting value adder for correcting the q-axis current command value by adding the q-axis current command correcting value to the q-axis current command value.

6. The electric motor car controller as in claim 5, further comprising:
   a rotational speed detector for detecting a rotational speed of the AC motor;
   a rotational speed coefficient unit for outputting a rotational speed coefficient inversely proportional to the rotational speed; and a rotational speed multiplier for correcting the q-axis current command correcting value according to the rotational speed by multiplying the q-axis current command correcting value by the rotational speed coefficient.

7. The electric motor car controller as in claim 5, further comprising:
   a direction command coefficient unit for receiving a motion direction command for forward motion or rearward motion of an electric motor car and outputting a direction coefficient responsive to the motion direction in response to a motion direction command; and
   a direction command multiplier for multiplying the q-axis current command correcting value by the direction command coefficient and correcting the q-axis command current correcting value according to the motion direction.

8. The electric motor car controller as in claim 5, further comprising a slip control unit for calculating a slip frequency command for the AC motor using an output from said q-axis current command correcting value adder which adds the q-axis current command value to the q-axis current command correcting value and which corrects the q-axis current command value.

* * * * *